United States Patent

McInnes

Patent Number: 6,098,849

Date of Patent: Aug. 8, 2000

[54] SELF-CONTAINED PORTABLE FLUID DISPENSING ASSEMBLY

[76] Inventor: Gregory Charles McInnes, 16 Forbes Road, Orange, N.S.W. 2800, Australia

[21] Appl. No.: 08/682,691

[22] PCT Filed: Dec. 13, 1994

[86] PCT No.: PCT/AU94/00769

§ 371 Date: Nov. 29, 1996

§ 102(e) Date: Nov. 29, 1996

[87] PCT Pub. No.: WO95/16634

PCT Pub. Date: Jun. 22, 1995

[30] Foreign Application Priority Data

Dec. 13, 1993 [AU] Australia ............... PM2908

[51] Int. Cl.$^7$ ............................................. B67D 5/64
[52] U.S. Cl. ............................ 222/175; 222/389; 222/399
[58] Field of Search ...................... 222/399, 387, 222/389, 175

[56] References Cited

U.S. PATENT DOCUMENTS 5,150,820  9/1992  McGill ............................ 222/389 X
5,199,609  4/1993  Ash, Jr. ........................... 222/399 X

*Primary Examiner*—Gregory L. Huson
*Attorney, Agent, or Firm*—Richard C. Litman

[57] ABSTRACT

A self-contained portable dispensing assembly for dispensing fluid substances, such as foodstuffs, and in particular ice cream. The dispensing assembly includes a housing capable of being mounted on the back of an operator, a vessel within the housing for holding the contents to be dispensed, a pressurized container for discharging a propellant into the vessel, and a discharge assembly in the form of an arm having a discharge valve through which the contents flow upon discharge of the propellant and actuation of the discharge valve. The dispensing assembly also includes a piston or diaphragm for energizing the contents of the vessel in response to movement of the piston by the propellant. A cooling assembly and a cone dispenser is also provided.

12 Claims, 8 Drawing Sheets

SELF-CONTAINED PORTABLE FLUID DISPENSING ASSEMBLY

BACKGROUND OF THE INVENTION

1. Field of the Invention

This invention relates to a portable dispensing assembly for dispensing fluid substances such as but not limited to foodstuffs such as ice-cream. More particularly, the invention relates to a dispensing assembly able to be worn as a "back-pack" by an operator so that the contents may be dispensed in remote locations.

The invention may also be used to dispense substances other than foodstuffs such as poisons, water, chemicals and the like. Although the invention is suitable for dispensing substances other than foodstuffs, it will be described principally with reference to its application for dispensing foodstuffs and particularly ice-cream.

2. Description of Related Art

Ice-cream is usually dispensed for purchase from an open, externally-cooled container, by the use of a scoop or by extension from a power-operated device, via a faucet or spigot. This form of dispensing means that the ice-cream storage containers must remain in one place as they are too heavy to be portable and cannot be separated from their source of refrigeration.

SUMMARY OF THE INVENTION

The present invention aims to overcome the several problems inherent in the above-mentioned systems by providing according to one embodiment a dispensing device for fluid substances and the like which is portable and includes self contained cooling means. Thus, the present invention, in one form, comprises a dispensing assembly including a vessel for the said substance; a floating piston or diaphragm arranged for movement in the vessel; a source of propellant gas for moving the piston or diaphragm within the vessel; a discharge line through which the substance is able to pass and which terminates in a dispensing nozzle in communication with a discharge valve; and a regulator valve for controlling the flow of propellant gas from the source to the rear face of the piston.

In a preferred embodiment of the invention, the above-described dispensing assembly is incorporated into a "back-pack" able to be carried by an operator so that a paste like substance such as ice-cream or the like may be dispensed and sold at remote locations. Such a back-pack form may also include cooling means such as a receptacle for ice or "dry ice" and a cone holder with an associated cone-feed mechanism.

In one broad form the present invention comprises;
a self contained portable dispensing assembly for dispensing fluid substances, the assembly comprising;
a vessel for holding contents to be dispensed,
a pressurised container for discharging a propellant, into said vessel,
a discharge assembly including a discharge valve through which the contents flow, wherein the propellant energises the contents of the vessel, upon actuation of the discharge valve; and
wherein the dispensing assembly is contained within a housing capable of mounting on the back of an operator of the dispensing assembly.

In another broad form the present invention comprises;
a portable fluid dispensing assembly including means for mounting the assembly on the back of an operator; the dispensing assembly comprising;
a vessel for storage of contents to be dispensed wherein the vessel is in communication with both a container for storing and discharging a propellant into said vessel to energise said contents and a discharge assembly through which the contents of the vessel are discharged via a discharge valve.

In its broadest form the present invention comprises;
a portable dispensing assembly for dispensing fluid substances; the dispensing assembly comprising;
a vessel for receiving and holding contents to be dispensed, which vessel is in communication with a propellent and a discharge assembly,
a container for the propellant capable of discharging the propellant under pressure into said vessel to energise said contents, wherein the energised contents are discharged from the assembly via the dispensing valve assembly.

According to a preferred embodiment, the dispensing assembly is contained within a housing forming a back pack which fits to the back of an operator via shoulder saddles and a waist harness.

BRIEF DESCRIPTION OF THE DRAWINGS

The present invention will now be described in more detail according to a preferred but non-limiting embodiment and with reference to the accompanying illustrations wherein.

DETAILED DESCRIPTION OF THE INVENTION

It should be noted that the drawings are by way of example only and that, throughout them, like features are indicated by the same numeral.

Figure 1:
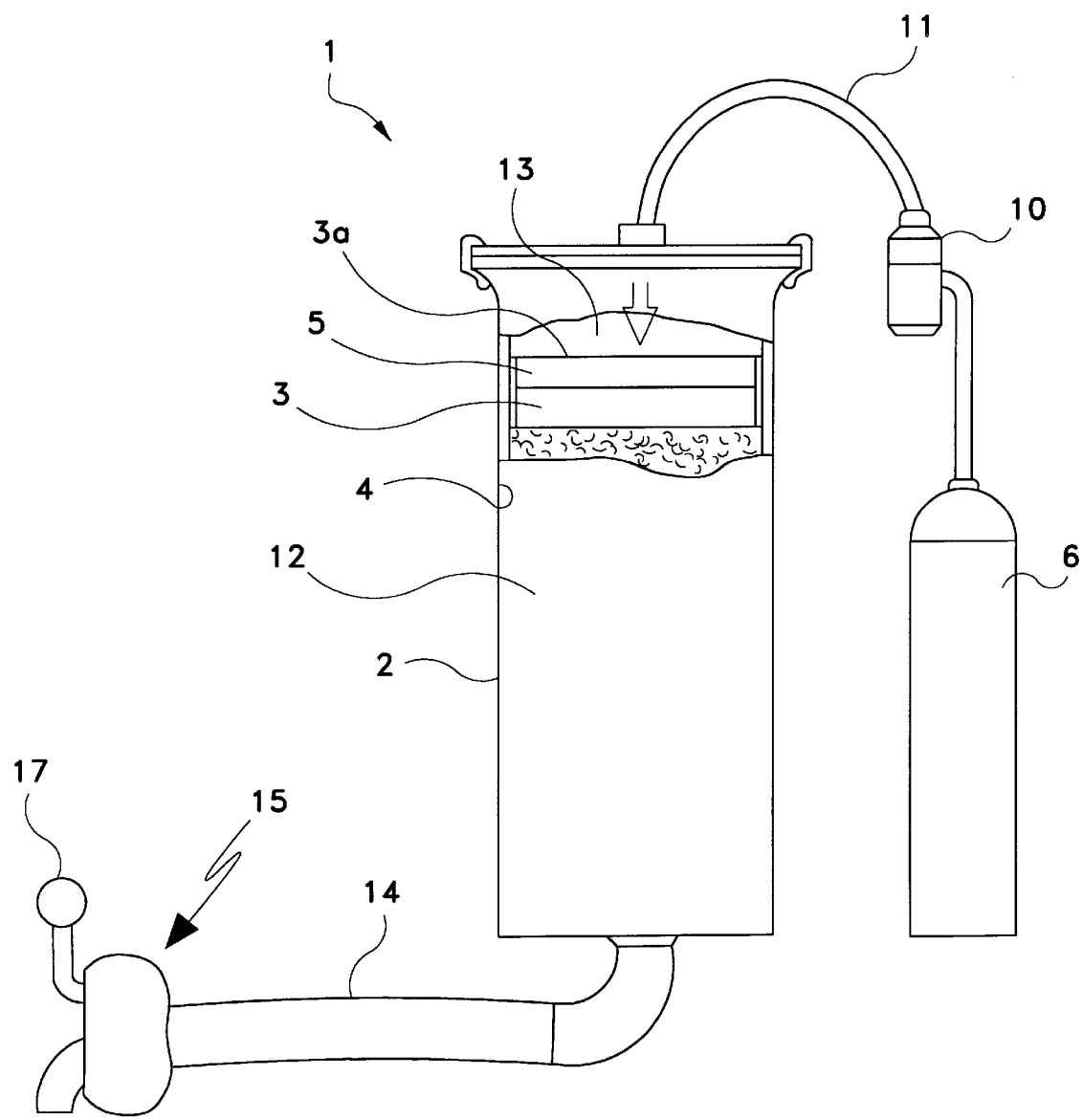
FIG. 1: shows a schematic view of a dispensing assembly according to preferred embodiment of the invention.

Referring to FIG. 1, there is shown a schematic layout of a dispensing assembly according to a preferred embodiment of the present invention.

The dispensing assembly shown comprises a preferably cylindrical vessel 2 for holding contents to be dispensed. Such contents may comprise a paste-like substance such as an ice-cream mix although it will be appreciated that fluid substances other than foodstuffs can be dispensed from the dispensing assembly.

Vessel 2 is, according to the embodiment described, constructed from a food compatible material strong enough to withstand operational pressures and includes a floating piston 3 adapted for movement therewithin. Piston 3 is in sealing engagement with the inner wall 4 of vessel 2 with the sealing effected by means of a sealing ring 5 engaging inner wall 4. Vessel 2 includes a gas bottle 6 containing a propellant gas such as compressed air or carbon dioxide. The propellant gas enters vessel 2 via regulator 10 which controls the flow of gas along feed line 11 to the rear face 3a of piston 3. Preferably regulator 10 is equipped with a filter. Under pressure, piston 3 forces the contents 12 of vessel 2 in the direction of arrow 13 towards discharge line 14. Discharge line 14 terminates in a discharge assembly 15 which includes dispensing valve 16 (see FIGS. 9a and b) responsive to operation of a control handle 17.

Figure 2:
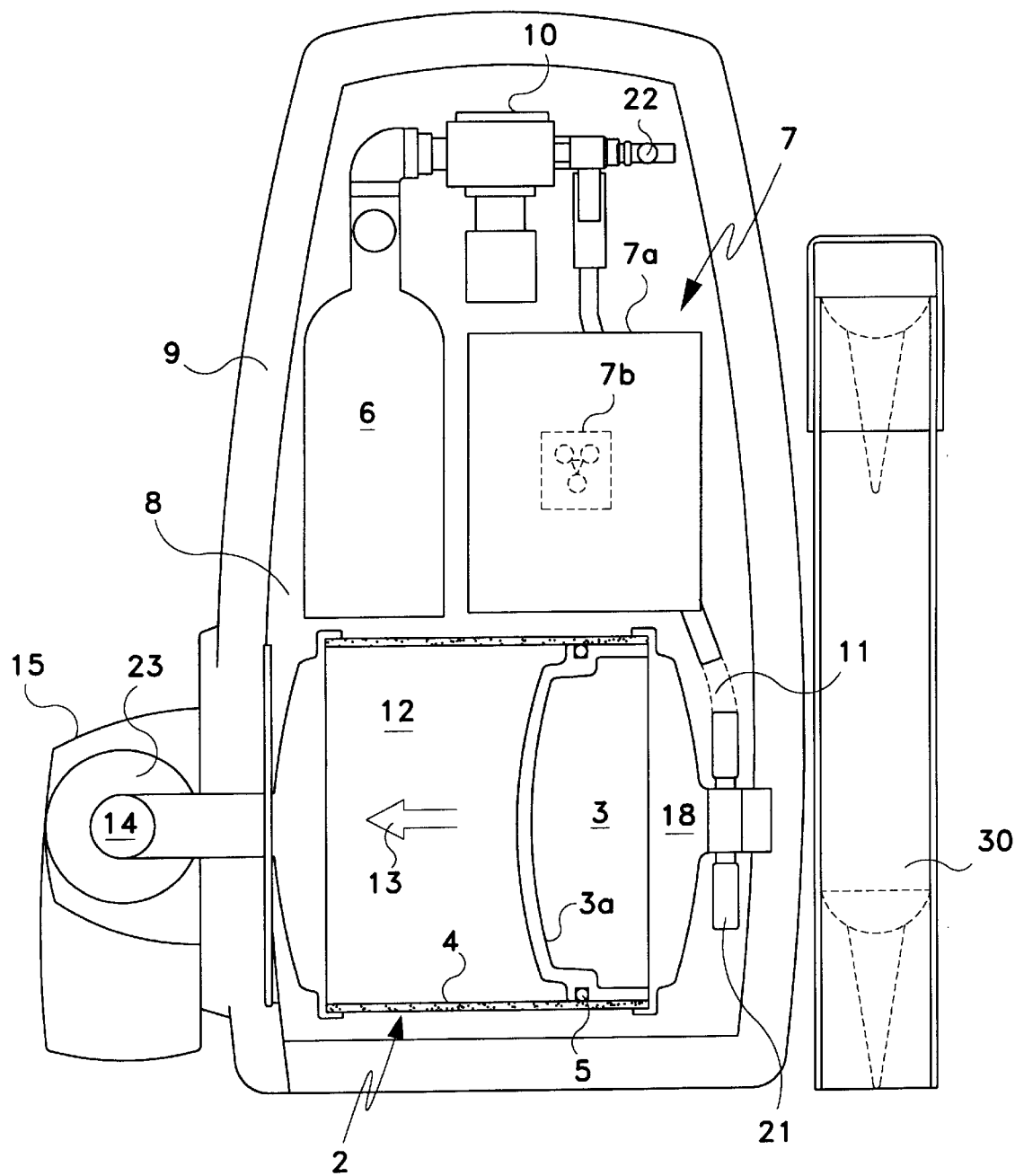
FIG. 2: shows a long section through a preferred embodiment of the dispensing assembly incorporated into a back pack housing.

Referring now to FIG. 2 there is shown a long section through a dispensing assembly of the type illustrated in FIG. 1. FIG. 2 shows the assembly 1 disposed within a cavity 8 formed by housing 9. As for the embodiment of FIG. 1, the assembly shown comprises a gas bottle 6 linked to regulator 10 which operates the flow of propellant to vessel 2 via feed line 11. Propellant gas flowing along feed line 11 to the vessel 2 travels via feed line connector 21 thence into space 20 behind piston 3 so that the propellant gas impinges on surface 3a of the piston 3. Piston 3 includes a sealing ring 5 which ensures separation between the contents 12 of the vessel and the propellant and reduces the possibility of binding of piston 3. Contents 12 exit vessel 2 via discharge line 14 which is contained in dispensing arm 23 and which terminates in discharge assembly 15.

Also included within housing 9 is a cooling assembly 7 which comprises a receptacle 7a, a coolant such as "dry-ice" contained in the receptacle and a fan 7b. The cooling is effected by air passage over the coolant which preferably comprises dry ice. To achieve this, fan 7b generates an air flow within housing 9. As the air is accelerated over the coolant, it cools, reducing the temperature within cavity 8 of housing 9. This cooled air circulates about vessel 2 thereby cooling the contents.

Ideally, vessel 2 of dispensing assembly 1 is adapted for speedy replenishment of contents. Access to the inside of vessel 2 is gained via lid 18 which is releasably attached to the wall 19 of vessel 2. When the vessel is to be charged with contents, lid 18 is removed after disconnecting feed line 11 from connecting assembly 21. Once lid 18 is removed this exposes piston 3 which can be readily removed from the inside of vessel 2 by simply sliding it along the internal wall 4 of vessel 2. The vessel can be completely removed from the housing, if necessary, to effect replenishment of the contents and/or cleaning. Once vessel 2 is refilled, cylinder 3 is then relocated within the vessel following which lid 18 is replaced. Reconnection of propellant feed line 11 is then made to connecting assembly 21. The propellant is activated after which the dispensing assembly is again ready for operation. Propellent bottle 6 includes a food approved propellent such as carbon dioxide and may be recharged once the propellent drops below a predetermined operational pressure. The propellant pressure in bottle 6 can be monitored by means of pressure gauge 10. When cylinder 6 is to be recharged any excess propellent can be released from the system via blow off pressure relief valve 22. Cylinder 6 can then be removed by uncoupling at junction 6a.

Figure 3:
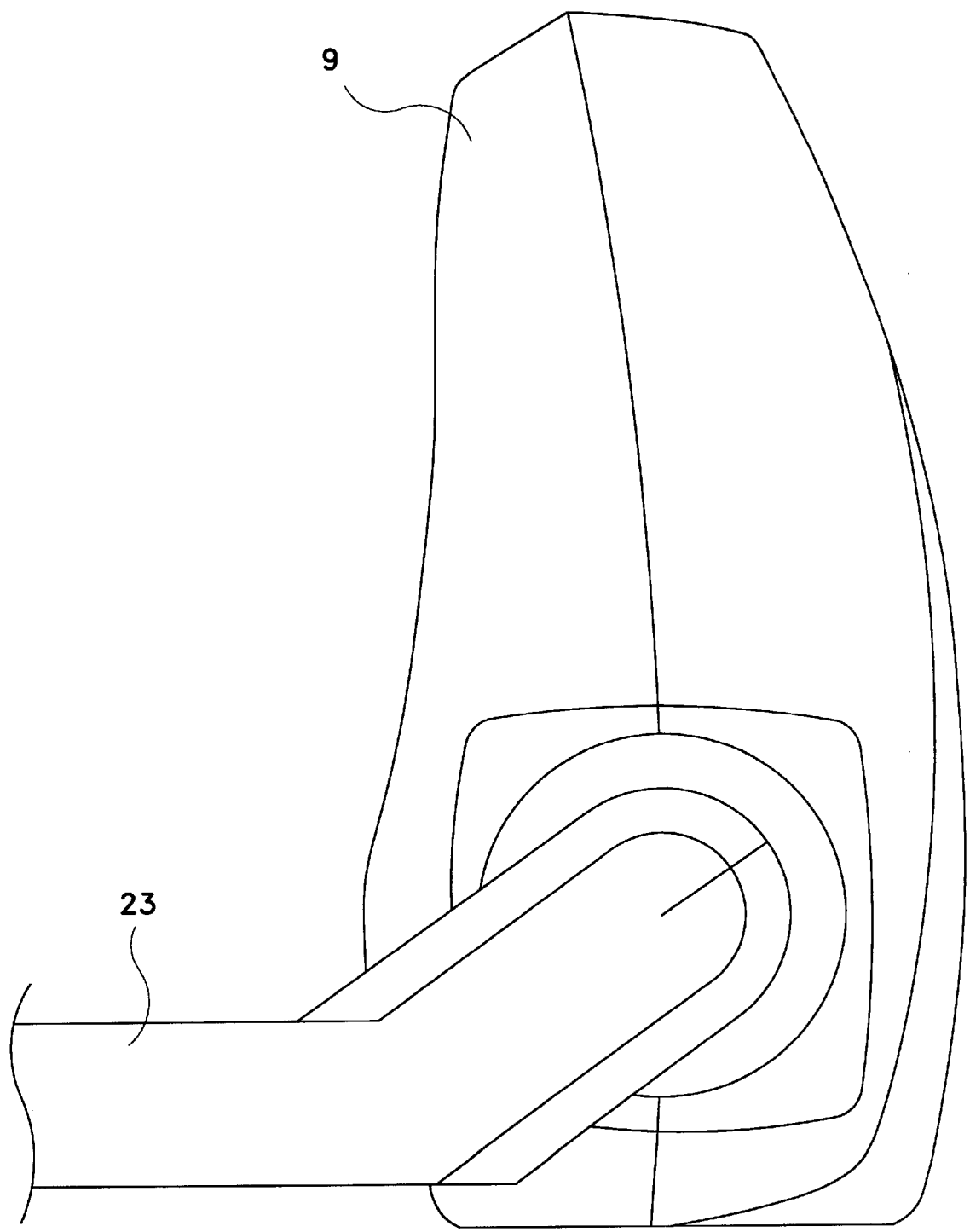
FIG. 3: shows a side elevation of the dispensing assembly of FIG. 2 (concealed) in a back pack housing according to one embodiment.

FIG. 3 shows a side elevation of the dispensing assembly 1 indicating the relationship between housing 9 and valve assembly support arm 23

Figure 4:
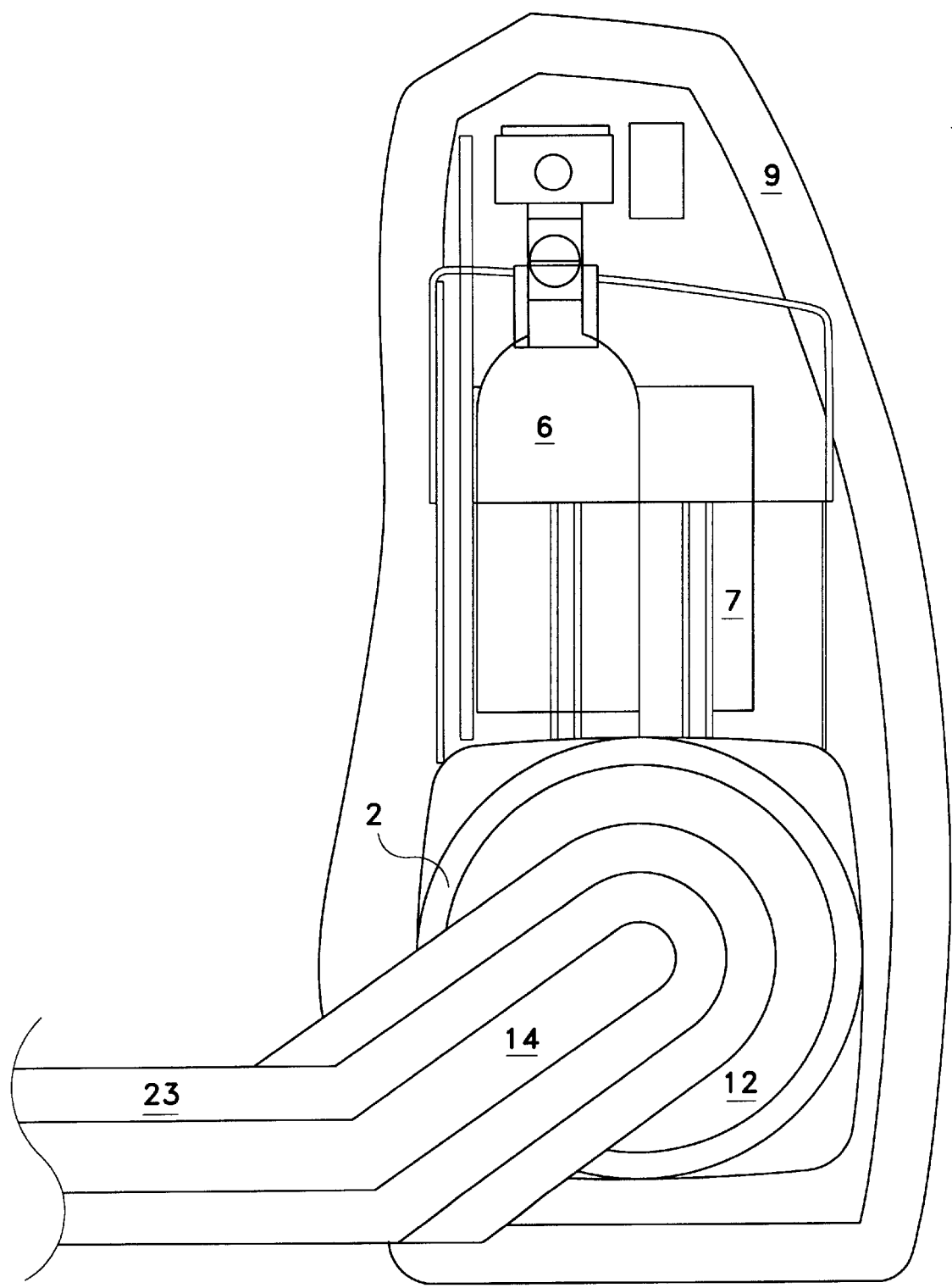
FIG. 4: shows a long section through the dispensing assembly showing the interrelationships between the internal components of the machine from a side elevation.

FIG. 4 shows a side long sectional elevation through the dispensing assembly of FIG. 2. As can be seen from FIG. 4, the vessel 2 is cylindrical with discharge line 14 connected at a point coincident with the central longitudinal axis of the vessel 2 along which line flows contents 12. Discharge line 14 travels within and along dispensing arm 23 terminating in discharge assembly 15 (see FIG. 2).

Figure 5:
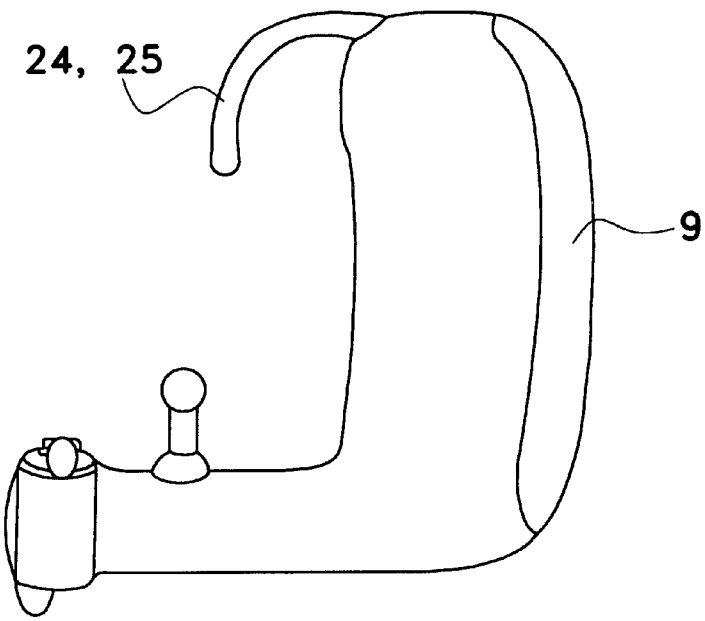
FIG. 5: shows a side view of the back pack housing according to an alternative embodiment of the invention.

FIG. 5 shows a side elevational view of the dispensing assembly concealed in housing 9 and includes shoulder saddles 24 and 25. These saddles enable housing 9 to be conveniently shoulder mounted on the operator and are preferably integrally formed with the housing.

Figure 6:
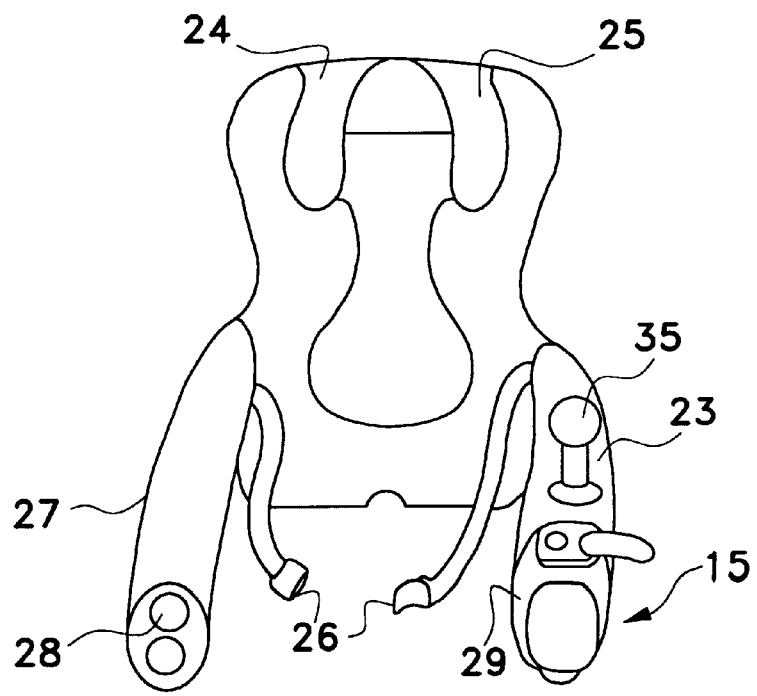
FIG. 6: shows a front elevation of the housing of FIG. 5 showing the arrangements for attachment of the back pack housing to an operator.

FIG. 6 shows a front elevation of the back pac dispenser of FIG. 5 showing both of the shoulder saddles 24 and 25. The back pack is further secured in position by means of a waist belt 26. Housing 9 and shoulder saddles 24, 25 may be constructed of a plastics material such as urethane or other suitable lightweight material. The discharge assembly 15 preferably comprises a handle 35 of the joy-stick type, as shown in FIG. 6. Arm-like portion 27 is similar to arm 23 and may contain an ice cream cone supply receptacle 28. Suitable covers may be provided for the cone feed and nozzle ends of arms 23 and 27 respectively. According to an alternative embodiment, a flavour dispensing unit 29 may be incorporated with the discharge assembly.

Figure 7C:
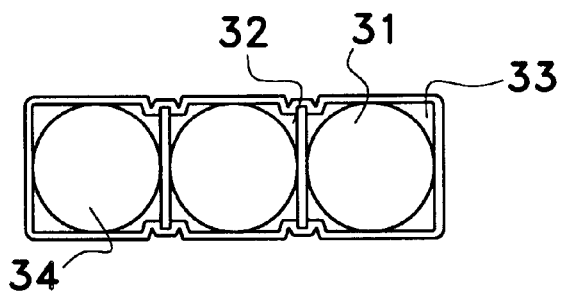
FIGS. 7a,b,c: show front, side and plan views respectively of a cone holding attachment.
Figure 7A:
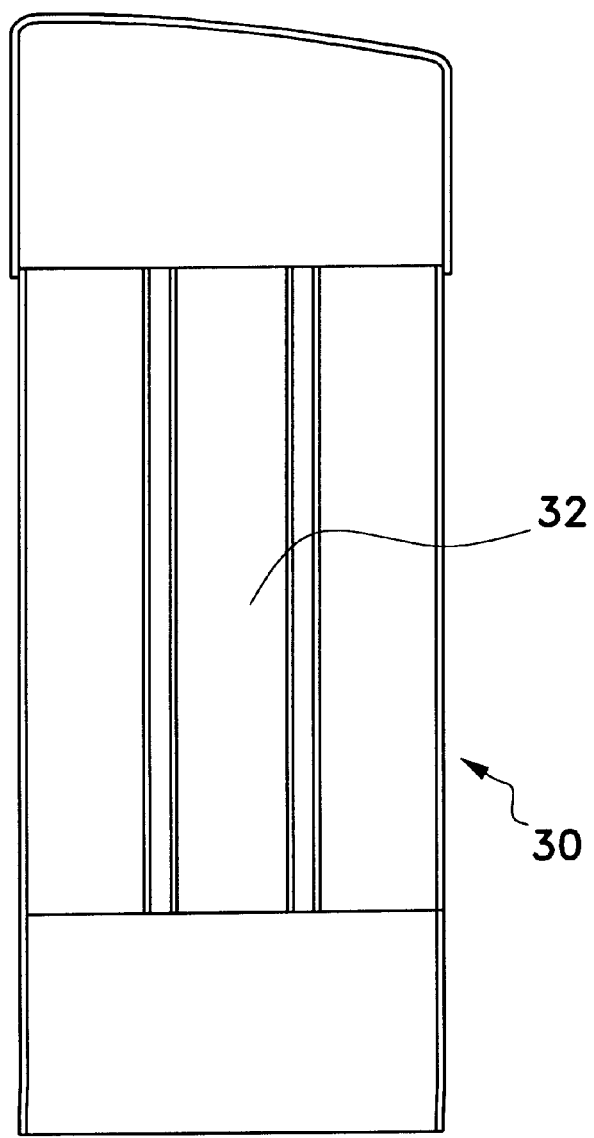
Figure 7B:
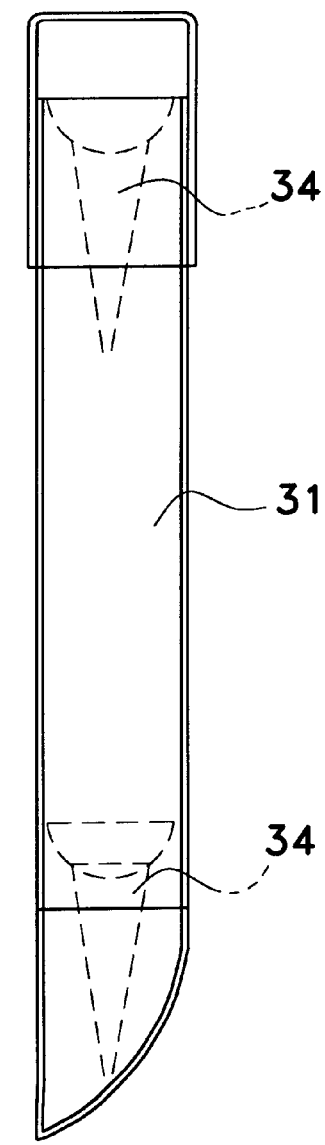

Referring to FIGS. 7a, b and c there is shown front, side and cross sectional views of an ice cream cone dispenser 30 which is attached to the housing 9 of the dispenser 1 in the manner shown in FIG. 2. When the dispenser is used for dispensing ice cream, the cone holder is attached to the housing thereby providing a ready supply of cones. According to the embodiment of FIG. 7a, the cone holder 30 comprises channels 31, 32 and 33 in which cones 34 are placed. FIG. 7b shows a side view of the cone holder 30 showing the positioning of cone 34 in channel 31. FIG. 7c shows a cross sectional view of the cone holder 30 showing channels 31, 32 and 33 containing cones 34. This is an optional attachment when ice cream is dispensed from the dispenser and can be removed when the dispenser is used for dispensing other substances.

Figure 8:
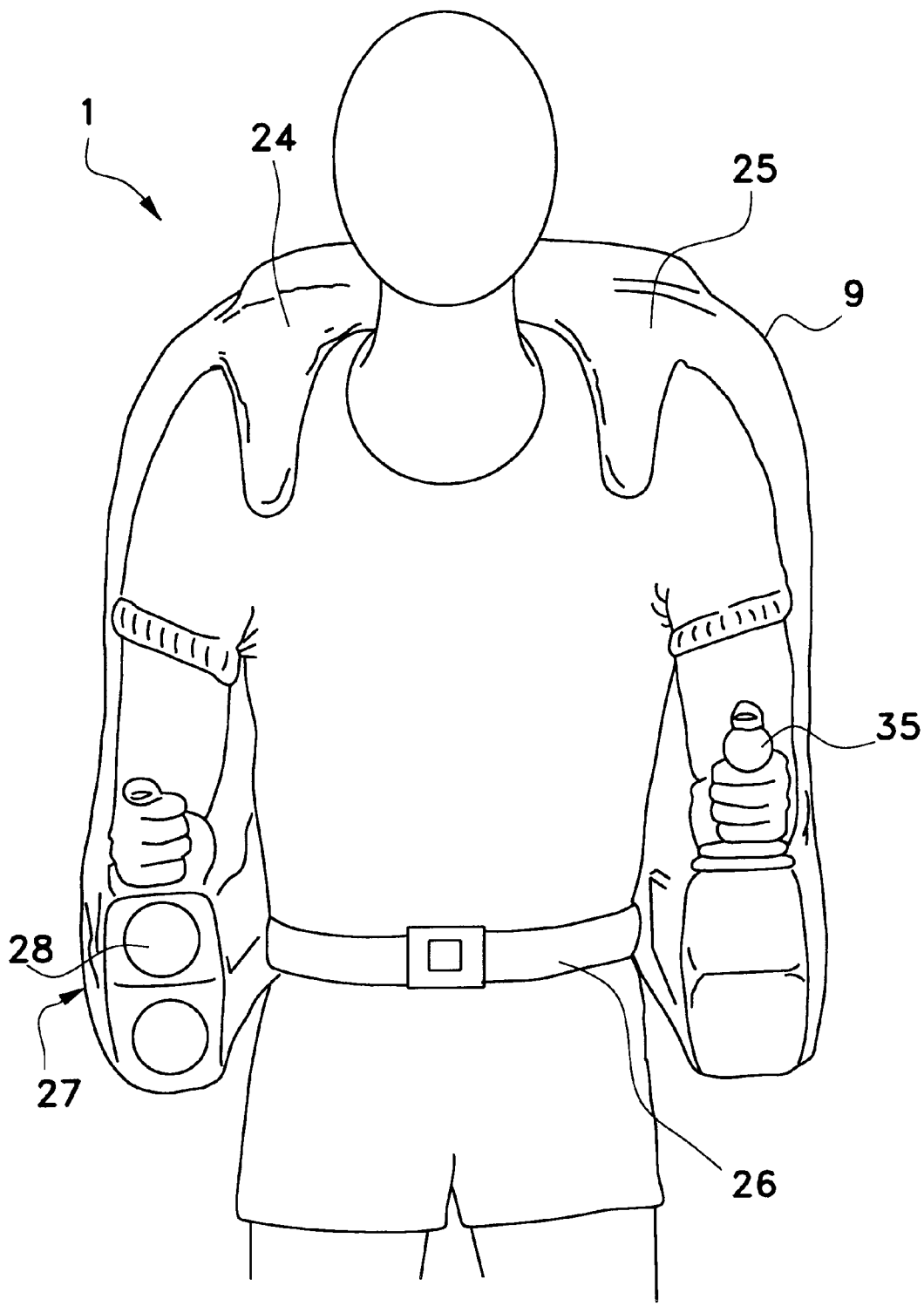
FIG. 8: shows a dispensing assembly incorporated into a back pack mounted on the back of an operator.

FIG. 8 shows an embodiment of the dispensing assembly 1 mounted on the back of a user via shoulder saddles 24 and 25. The user can be seen manipulating joy stick handle 35 which operates the discharge assembly 15. According to the embodiment shown, arm 27 includes cone supply receptacles 28. Waist belt 26 secures the dispensing assembly to the user as shown.

Figure 9A:
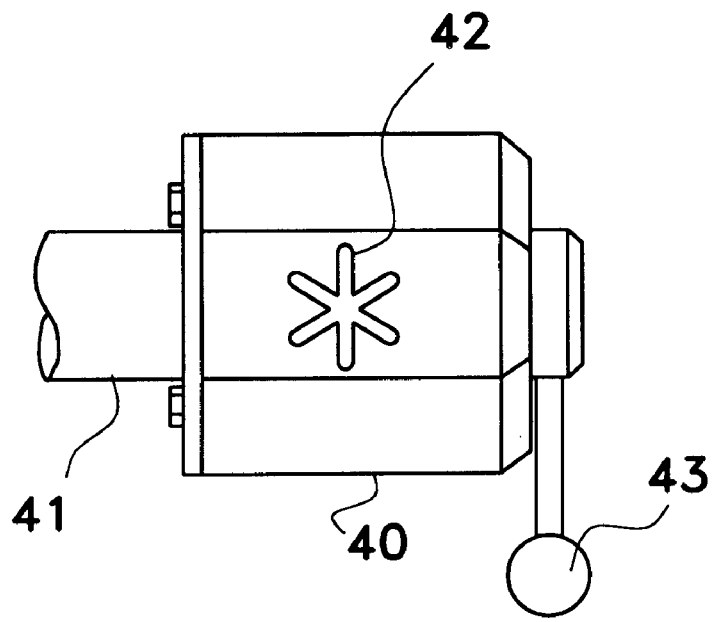
FIGS. 9a,b: show an underside view and front elevation of a dispensing valve according to a preferred embodiment.
Figure 9B:
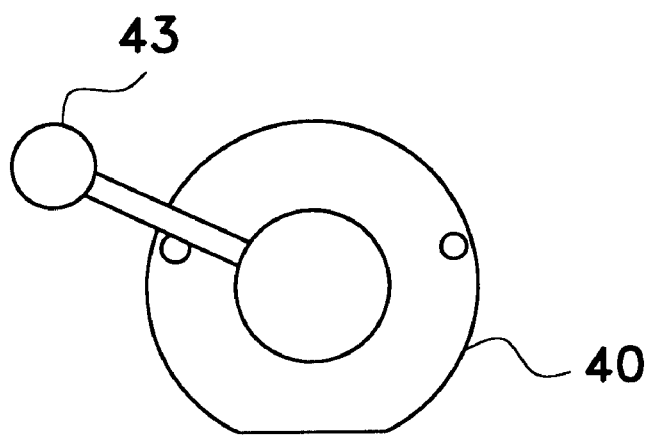

Referring to FIGS. 9a and b there is shown a dispensing valve 16 which may be incorporated into the discharge assembly 15. FIGS. 9a and b show an underside and front elevation of the valve respectively. The valve comprising a valve body 40 including a through passage 41 which communicates between an outlet 42 and discharge line 14 (see FIGS. 1 or 2). Valve 16 also comprises a manually operable handle 43 which moves between an open and closed position. The handle moves through an arc of approximately 160°.

In the open configuration the contents of the vessel 2 are able to flow out of the valve body 40 via outlet 42. When in the closed configuration outlet 42 is blocked to prevent discharge of contents 12 and this is effected by rotation of the handle 43 through about 160°.

It is envisaged that the present invention in its basic form as shown in FIG. 1 will have application in mobile facilities such as motor vans, ice-cream carts, trailers and the like as well as use on stalls, in shops, etc. and is likely to be less expensive than are existing installations.

It is foreseen that the invention may well be offered for hire for parties and similar functions. The back pack embodiment is useful for vending dispensing products such as ice cream at sporting events, street parades, beaches, theme parks etc. In an alternative embodiment the contents of vessel 2 may be discharged by means of a dispensing gun connected to discharge line 14 and retained in a holster worn by the operator.

In a further embodiment the discharge assembly comprises a hand compatible control having a press button which actuates discharge of contents. The control is attached to feed line 14 by means of a flexible hose which allows the control to be freely moved within a limited range of movement. Ideally, the button is actuated by the thumb of an operator and the control is grippingly engaged between the thumb and fingers via ergonomically optimal contours on the control.

It will be recognised by persons skilled in the art that numerous variations and modifications can be made to the invention as broadly described herein without departing from the overall spirit and scope of the invention.

I claim:

1. A self contained portable ice cream dispensing assembly for mounting on the back of a person, said dispensing assembly comprising:

a housing defining a cavity and configured to form a back pack for mounting to the back of an operator;

a cylindrical vessel dimensioned and configured to fit within the cavity of said housing, said vessel for receiving and holding ice cream to be dispensed therefrom and sealing ice cream therewithin;

a pressurized container disposed within the cavity of said housing, said container adapted to discharge a propellant for pressurizing said vessel;

cooling means for maintaining the temperature of the ice cream within said vessel;

an arm extending from said housing and terminating at a free end having an outlet, said arm having a length such that the free end is generally located at a region which approximates the location of the hand of an operator;

a hand operable discharge assembly disposed adjacent the free end of said arm, said discharge assembly including a control valve for manually controlling the discharge of the ice cream; whereby upon actuation of the control valve by an operator, ice cream stored in said vessel exits said vessel under pressure and travels along a discharge line contained in said arm and exits via the outlet in said arm.

2. The dispensing assembly according to claim 1, wherein said vessel includes therein a piston driven by flow of the propellant which is regulated by a regulator valve.

3. The dispensing assembly according to claim 1, wherein communication between the vessel and the discharge assembly is effected by means of said discharge line having one end terminating at the control valve of said discharge assembly, wherein said discharge line is charged with ice creme prior to exiting said outlet.

4. The dispensing assembly according to claim 1, wherein said pressurized container comprises a gas bottle connected to a feed line which communicates with said vessel via a pressure regulator.

5. The dispensing assembly according to claim 1, wherein said cooling means includes a receptacle for receiving and retaining a coolant and means for circulating cooled air at least around the vessel.

6. The dispensing assembly according to claim 5, wherein said means for circulating cooled air comprises a fan for generating air flow over the coolant and a thermostat for controlling the fan.

7. The dispensing assembly according to claim 5, wherein the coolant is dry ice.

8. The dispensing assembly according to claim 1, wherein the housing is manufactured from a molded, lightweight plastic material.

9. The dispensing assembly according to claim 1, wherein said vessel has internal surfaces made of a food compatible material.

10. The dispensing assembly according to claim 1, wherein said housing includes shoulder saddles and a waist belt attached thereto for mounting on the back of an operator.

11. The dispensing assembly according to claim 1, wherein said cooling means is disposed within the cavity of said housing.

12. The dispensing assembly according to claim 1, wherein said housing includes an ice cream cone supply receptacle.

* * * * *